(12) United States Patent
Holmes et al.

(10) Patent No.: US 12,240,261 B2
(45) Date of Patent: Mar. 4, 2025

(54) OPTICAL DEVICES AND METHODS OF MANUFACTURE THEREOF

(71) Applicant: DE LA RUE INTERNATIONAL LIMITED, Basingstoke (GB)

(72) Inventors: Brian Holmes, Basingstoke (GB); Frederic Fournier, Basingstoke (GB); Maria King, Basingstoke (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 18/271,337

(22) PCT Filed: Jan. 11, 2022

(86) PCT No.: PCT/GB2022/050049
§ 371 (c)(1),
(2) Date: Jul. 7, 2023

(87) PCT Pub. No.: WO2022/148977
PCT Pub. Date: Jul. 14, 2022

(65) Prior Publication Data
US 2024/0051324 A1 Feb. 15, 2024

(30) Foreign Application Priority Data
Jan. 11, 2021 (GB) ..................... 2100327

(51) Int. Cl.
B42D 25/328 (2014.01)
B42D 25/324 (2014.01)
(Continued)

(52) U.S. Cl.
CPC ......... B42D 25/328 (2014.10); B42D 25/324 (2014.10); G03H 1/0841 (2013.01); B42D 25/351 (2014.10); G03H 2001/085 (2013.01)

(58) Field of Classification Search
None
See application file for complete search history.

(56) References Cited

U.S. PATENT DOCUMENTS 5,555,129 A * 9/1996 Konno ................... G02B 27/46
359/569
5,886,798 A * 3/1999 Staub ..................... B42D 25/23
359/569

(Continued)

FOREIGN PATENT DOCUMENTS

DE 10 2017 120 536 A1 3/2019
EP 0 059 056 A1 9/1982
(Continued)

OTHER PUBLICATIONS

Esem L B et al., "The Kinoform: A New Wavefront Reconstruction Device", I.B.M. Journal of Research and Development, vol. 13, No. 2, 1969, pp. 150-155, XP001377060.
(Continued)

Primary Examiner — Kyle R Grabowski
(74) Attorney, Agent, or Firm — Oliff PLC

(57) ABSTRACT

An optical device is provided that exhibits a variable optical effect upon illumination. The optical device has a diffractive structure comprising: a portion of a first kinoform diffractive structure that encodes a first image, arranged to form a first diffractive region (11) of the diffractive structure; and a portion of a second kinoform diffractive structure that encodes a second image, arranged to form a second diffractive region (13) of the diffractive structure; wherein the first diffractive region and the second diffractive region are laterally separate; and each of the first diffractive region and the second diffractive region are discernible by the naked human eye. Methods of manufacture of such optical devices are also disclosed.

19 Claims, 13 Drawing Sheets

(51) Int. Cl.
*G03H 1/08* (2006.01)
*B42D 25/351* (2014.01)

(56) References Cited

U.S. PATENT DOCUMENTS

| | | |
|---|---|---|
| 10,207,531 B2 | 2/2019 | Seils et al. |
| 2009/0162756 A1 | 6/2009 | Staub et al. |
| 2010/0165425 A1 | 7/2010 | Tompkin et al. |
| 2011/0128600 A1 | 6/2011 | Tompkin et al. |
| 2020/0384791 A1 | 12/2020 | Mader et al. |
| 2021/0150296 A1* | 5/2021 | Kagotani ............... G03H 1/265 |
| 2021/0199963 A1* | 7/2021 | Li ..................... G02B 27/0101 |

FOREIGN PATENT DOCUMENTS

| | | | |
|---|---|---|---|
| EP | 0 723 501 A1 | 7/1996 | |
| EP | 0 724 519 A1 | 8/1996 | |
| EP | 0 860 298 A2 | 8/1998 | |
| EP | 1 141 480 A1 | 10/2001 | |
| EP | 1 398 174 A1 | 3/2004 | |
| EP | 3 466 712 A1 | 4/2019 | |
| EP | 3 842 252 A1 | 6/2021 | |
| GB | 2 542 253 A | 3/2017 | |
| RU | 190 048 U1 | 6/2019 | |
| WO | 83/00659 A1 | 3/1983 | |
| WO | 00/39391 A1 | 7/2000 | |
| WO | 03/054297 A2 | 7/2003 | |
| WO | 03/095188 A2 | 11/2003 | |
| WO | 2011/107782 A1 | 9/2011 | |
| WO | WO-2020004633 A1 * | 1/2020 | ............. B42D 13/00 |

OTHER PUBLICATIONS

Van Renesse Rudolf L.: "Vector-Oriented Devices—Kinegram" In: Optical Document Security, 2005, Artech House, Boston, Mass. [u.a.], XP55899431, ISBN: 978-1-58053-258-7, pp. 202-205.

Jul. 12, 2021 combined Search and Examination Report issued in British Patent Application No. 2100327.2.

Mar. 18, 2022 International Search Report issued in International Patent Application No. PCT/GB2022/050049.

Mar. 18, 2022 Written Opinion of the International Searching Authority issued in International Patent Application No. PCT/GB2022/050049.

* cited by examiner

OPTICAL DEVICES AND METHODS OF MANUFACTURE THEREOF

FIELD OF THE INVENTION

The present invention is directed to optical devices and their method of manufacture. The invention is particularly applicable to the field of security devices, where such optical devices may be used as means of determining the authenticity of a security document such as a banknote or passport.

INTRODUCTION

Articles of value, and particularly documents of value such as banknotes, cheques, passports, identification documents, certificates and licences, are frequently the target of counterfeiters and persons wishing to make fraudulent copies thereof and/or changes to any data contained therein. Typically such documents are provided with a number of visible optical devices acting as security devices for checking the authenticity of the object. By "security device" we mean a feature which is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of optical devices are those which produce an optically variable effect, meaning that the appearance of the device is different at different angles of view and/or illumination. Such devices are particularly effective as security devices since direct copies (e.g. photocopies) will not produce the optically variable effect and hence can be readily distinguished from genuine devices. Optically variable effects can be generated based on various different mechanisms, including holograms and other diffractive devices, moiré interference and other mechanisms relying on parallax such as venetian blind devices, and also devices which make use of focusing elements such as lenses, including moiré magnifier devices, integral imaging devices and so-called lenticular devices.

As counterfeiting techniques become ever more sophisticated, there is an increasing need to improve the security level of security devices.

SUMMARY OF THE INVENTION

In accordance with a first aspect of the invention, we provide an optical device that exhibits a variable optical effect upon illumination, the optical device having a diffractive structure comprising: a portion of a first kinoform diffractive structure that encodes a first image, arranged to form a first diffractive region of the diffractive structure; and a portion of a second kinoform diffractive structure that encodes a second image, arranged to form a second diffractive region of the diffractive structure; wherein the first diffractive region and the second diffractive region are laterally separate; and each of the first diffractive region and the second diffractive region are discernible by the naked human eye.

The present invention utilises the diffractive properties of kinoform diffractive structures in order to generate a variable optical effect that is straightforward to authenticate, and yet difficult to counterfeit. The present invention therefore advantageously provides an optical device with a high level of security.

A "kinoform" may be described as a relief structure which modifies an incident electric field in accordance with the calculated phase $\varphi(x,y)$ of the electric field propagated from an object to image to the "hologram plane". A kinoform diffractive structure records the phase $\varphi(x,y)$ of the field, such that when illuminated, the kinoform diffractive structure exhibits a recreated image of the object. In this way, a kinoform diffractive structure "encodes" a respective (diffractive) image. Herein, the terms "kinoform" and "kinoform diffractive structure" may be used interchangeably.

Computer generated holography (CGH) techniques lend themselves well to the generation of such kinoform diffractive structures, and preferably the diffractive structure is computer generated. When synthesising a kinoform diffractive structure using computational techniques, the object may be approximated to a plurality of point sources, with the kinoforms for each point source superposed to form the kinoform diffractive structure for the object. The kinoform for a point source has the form of a Fresnel lens and can be approximated by a Fresnel zone plate (or "binary kinoform") to distribute the replayed light evenly in the positive and negative orders of diffraction. The kinoform of a point source in the form of a Fresnel lens is a multi-level structure with multiple structure depths. Such a multi-level structure can be approximated to a binary structure using a thresholding process on the structure depths. A binary structure is preferred in the present invention as the replayed light is distributed evenly in the positive and negative order of diffraction, and typically each of the first kinoform diffractive structure and the second kinoform diffractive structure (and any further kinoform diffractive structure used) is a binary kinoform diffractive structure. However, both multi-level and binary structures may be utilised in the device to provide different replay (e.g. depth and brightness) effects upon a change in viewing angle.

Although computationally intensive, CGH techniques advantageously do not require the physical object to be present, or complex optical arrangements, to record the interference light pattern and generate the diffractive structure.

Further background on kinoforms may be found in "The Kinoform: A New Wavefront Reconstruction Device" L. B. Lesem, P. M. Hirsch and J. A. Jordan Jr. IBM J. Res. Develop (1969).

When illuminated, a kinoform diffractive structure encoding a particular image replays the image which is perceived to exhibit full parallax motion; that is, the replayed image is perceived to move upon both "vertical" (north-south) and "horizontal" (east-west) tilting of the diffractive structure. Moreover, the replayed image is perceived to be positioned in a plane that is either in front of or behind the plane of the device, depending on the viewing angle and the particular portion of the kinoform diffractive structure from which the incident light is diffracted from. The replayed image will appear to "float" in front of the plane of the device when the diffracted light rays from the device converge to be focussed at the observer's eye. In contrast, the replayed image will appear to be behind the plane of the device as a virtual image when the light rays diffracted by the optical device diverge towards the observer.

In general, each portion of such a kinoform diffractive structure will replay the encoded image, but with different replay effects dependent on the particular portion.

The optical device of the present invention has a diffractive structure that comprises a portions of respective first and second kinoform diffractive structures. In other words, the portions of the optical device are portions of respective "full" kinoform diffractive structures encoding respective images. For example, the portion of the first kinoform diffractive structure may be half (e.g. the "top half") of the first kinoform diffractive structure, and the portion of the second kinoform diffractive structure may be the complementary half (e.g. "bottom half") of the second diffractive structure. In this way, the portions of the kinoform diffractive structures in the present invention may be considered to be portions of the respective "full"—or "complete"—kinoform diffractive structures. The "full" kinoform may be described as such since it contains the complete phase function of the electric field propagating from the image object.

In this way, the present invention advantageously combines the relative motion and depth effects of the kinoform diffractive structures with the particular replay effects of the specific portions thereof, in order to generate striking visual effects that are difficult to replicate.

The portions of the first and second kinoform diffractive structures are arranged to form respective first and second (e.g. continuous) diffractive regions of the diffractive structure. Thus, the first image is generated substantially completely by diffraction of incident light from the first diffractive region, and the second image is generated substantially completely by diffraction of incident light from the second diffractive region. The first and second diffractive regions may be described as substantially continuous in the sense that they are not interrupted across their domain. In other words, the first and second diffractive regions are not interlaced with each other.

Each of the first diffractive region and the second diffractive region are discernible by the naked human eye (and hence, each of the portions of the kinoform diffractive structures are discernible by the naked human eye). In other words, both the first and second diffractive regions have dimensions such that they may be seen by the naked human eye; that is, without the aid of magnifying apparatus. Thus, both the first and second diffractive regions may be described as "macroscopic". In this way, when viewing the device, the viewer is able to perceive the full size of each image replayed by each diffractive portion arranged, with the particular replay characteristics of the portion. In particular, each of the first and second diffractive regions has dimensions at least the size of the replayed image, whereby the full image may be observed at least at one viewing angle, dependent on the replay characteristics of the portion of the "full" kinoform diffractive structure used. Furthermore, by using such "macroscopic" first and second diffractive regions, the images replayed by the device exhibit increased brightness compared to, for example, interlaced arrangements.

It is generally understood that the naked human eye cannot resolve dimensions less than ~150 microns at typical viewing distances of ~30 cm. Preferably therefore, each of the first diffractive region and the second diffractive region has a size greater than 150 microns (e.g. 150 microns by 150 microns). However, more preferably, each of the first diffractive region and the second diffractive region (and hence, the dimensions of each of the portions) has dimensions greater than 1×1 millimetre ("1 mm²"), preferably wherein each of the first diffractive region and the second diffractive region has dimensions within the range of 10 mm² (e.g. 2×5 millimetres) to 300 mm² (e.g. 30×10 millimetres). Thus, a typical single dimension of the diffractive regions (e.g. a "length" or a "width") is preferably in the range between 1 millimetre and 30 millimetres. In this way, the images replayed by the first and second diffractive regions are easily perceived the observer.

In this way, when the device is illuminated, the first diffractive region typically exhibits the first image that is perceived to be in front of the plane of the device, or behind the plane of the device dependent on viewing angle, and that is perceived to move within a first image area corresponding to the first diffractive region upon a change in viewing angle; and the second diffractive region typically exhibits the second image that is perceived to be in front of the plane of the device, or behind the plane of the device dependent on viewing angle, and that is perceived to move within a second image area corresponding to the second diffractive region upon a change in viewing angle. It will be understood that each of the diffractive regions will exhibit the full image at least at one viewing angle. At other viewing angles, only a portion of the image may be exhibited, for example when viewing the outer perimeter of a diffractive region, in which case the image may appear truncated against the edge of the diffractive region.

Since the first diffractive region and the second diffractive region are laterally separate, the first and second image areas—and therefore the first and second images—do not overlap. In other words, the replayed images do not overlap with each other when the device is viewed.

In some embodiments, the first and second diffractive regions may be laterally spaced apart so that there is a "gap region" between the first and second diffractive regions. However, preferably, the first diffractive region and the second diffractive region abut each other. In other words, in preferred embodiments the diffractive regions share a common border (and thus may be described as contiguous).

As discussed, although typically the diffractive regions are contiguous, in some alternative embodiments the first diffractive region and the second diffractive region may be laterally spaced apart. In such embodiments, the optical device preferably further comprises a non-diffractive component located between the first diffractive region and the second diffractive region, preferably wherein the non-diffractive component is contiguous with each of the first diffractive region and the second diffractive region. Thus, preferably the non-diffractive component "fills" the gap region between the first and second diffractive regions. Such a non-diffractive component may be in the form of a planar metal component, or an ink working for example. The non-diffractive component is typically optically invariant such that it exhibits substantially the same optical effect at all angles of view (e.g. in contrast to diffractive structures).

The use of such a "gap region" and, optionally, a non-diffractive component can advantageously be used to control the optical effect perceived at the boundary between the first and second diffractive regions, for example to increase the security level of the device. The use of such a non-diffractive component may also be used to augment the optical effect of the kinoform diffractive structures.

In embodiments in which the first and second diffractive regions are laterally spaced apart, the distance between the first and second diffractive regions is typically greater than 2 μm and less than 100 μm, typically between 5 μm and 50 μm.

In some embodiments, the portions of the first and second kinoform diffractive structures may be corresponding portions of the respective "full" kinoform diffractive structures. For example, the first portion may be the top half of the first "full" kinoform diffractive structure, and the second portion may likewise be the top half of the second "full" kinoform diffractive structure. Such an arrangement will mean that the exhibited images will exhibit corresponding replay characteristics. For example, when corresponding portions of the respective full kinoforms are used, at a given viewing angle, the replayed images will be perceived to be on the same side of the device (e.g. either appearing to be behind the plane of the device, or being perceived to "float" in front of the plane of the device), and will move in substantially the same direction when changing the viewing angle, e.g. by tilting the device.

However, in particularly preferred embodiments of the present invention, the portion of the first kinoform diffractive structure and the portion of the second kinoform diffractive structure are complementary. In other words, the diffraction characteristics of the respective portions are such that the attributes of the replayed images are complementary. This may be achieved by using substantially opposing portions of the respective full kinoform diffractive structures. For example, in a particularly preferred embodiment, the portion of the first kinoform diffractive structure may be the top half of the "full" structure, with the portion of the second kinoform diffractive structure being the bottom half of the "full" structure. In another example, the portion of the first kinoform diffractive structure may be the left half of the "full" structure, and the portion of the second kinoform diffractive structure may be the right half of the "full" structure. However, other portions of the respective "full" kinoform diffractive structures may be used to achieve different replay effects.

Preferably, the portion of the first kinoform diffractive structure and the portion of the second kinoform diffractive structure are such that (e.g. the diffraction characteristics of the portions are such that), at least at one viewing angle, the first image is perceived to be on one side of the plane of the optical device, and the second image is perceived to be on the opposing side of the plane of the optical device. This complementary effect provides a particularly striking effect, with one of the images appearing to "float" in an image plane in front of the plane of the device, and the other of the images appearing to lie in an image plane behind the plane of the device.

The perceived depth of each replayed image with respect to the plane of the optical device will reverse as the viewing angle moves from one side of the specular reflection (zero order) direction to the other. When viewing the optical device along a viewing angle "above" the direction of specular reflection, the "positive" (e.g. +1) order diffraction effects are observed, in which the replayed images are perceived to have a particular depth relationship with respect to the device plane. When then optical device is tilted so as to be viewed "below" the direction of specular reflection, the "negative" (e.g. −1) order diffraction effects are observed, and the perceived depth relationship of the image reverses.

Although higher orders of diffraction will replay (e.g. $2^{nd}$ order, $3^{rd}$ order), these are typically significantly reduced in intensity compared to the first order effects, and it is therefore primarily the first order diffraction effects that are perceived. The images are typically visible over a viewing angle range of approximately 40 degrees to 50 degrees within one order of diffraction.

Preferably, the portion of the first kinoform diffractive structure and the portion of the second kinoform diffractive structure are such that (e.g. the diffraction characteristics of the portions are such that), upon tilting the device, the first image and the second image are perceived to move in substantially opposing directions when the device is tilted about at least one axis. This complementary kinematic effect provides a striking variable optical effect to the observer. For example, upon vertical tilting of the device, the first and second images may be perceived to move in opposing directions along an axis substantially perpendicular to the tilt axis (i.e. the images are perceived to move in opposing directions along the north-south axis). Particularly preferably, the first image and the second image are perceived to move in opposing directions when the device is tilted above two independent, preferably orthogonal, axes. For example as well as moving in opposing directions along the north-south axis upon vertical tilting, the images may also be perceived to move in opposing directions along the east-west axis upon horizontal tilting of the device. When the device undergoes more complex tilting comprising components of both vertical and horizontal tilting, the images may be observed to move in opposing curvilinear trajectories. In this way, the device of the present invention may be described as exhibiting full parallax images.

However, as discussed above, the perceived motion of each image upon tilting of the device is constrained to remain within its respective image area.

In general the portion of the "full" kinoform used to form each diffractive region defines the relative motion and depth of the replayed images, and the arrangement of the diffractive regions defines the (distinct) areas within which the replayed images are perceived to move upon a change in viewing angle. The diffractive regions of the device typically have substantially the same dimensions. The diffractive regions of the device may be symmetrical, particularly in devices comprising exactly two diffractive regions.

In embodiments, the diffractive structure may further comprise a portion of a third kinoform diffractive structure that encodes a third image, arranged to form a third diffractive region of the diffractive structure; wherein the third diffractive region is laterally separate to the first diffractive region and the second diffractive region; and the third diffractive region is discernible by the naked human eye. In this way, the device may exhibit further complex depth and kinematic effects upon tilting. Typically, for a given viewing angle of the optical device, two of the replayed images are perceived to be on opposing sides of the optical device plane.

The device of the present invention may comprise portions of four or more kinoform diffractive structures arranged in respective diffractive regions.

Typically, the first and second images (and third and further images, when present), are in the form of indicia such as symbols and alphanumeric characters. Typically, the first and second images (and third and further images, when present) are different to each other.

In accordance with a second aspect of the invention, we provide a method of forming an optical device that exhibits a variable optical effect upon illumination, the method comprising: providing a portion of a first kinoform representation encoding a first image; providing a portion of a second kinoform representation encoding a second image; forming a diffractive structure in a carrier layer, wherein the diffractive structure comprises a first diffractive region corresponding to the portion of the first kinoform representation, and a second diffractive region corresponding to the portion of the second kinoform representation; wherein the first diffractive region and the second diffractive region are laterally separate; and each of the first diffractive region and the second diffractive region are discernible to the naked human eye.

The resulting device provides all of the benefits already discussed above.

The first and second kinoform representations are typically computer generated and are in the form of respective computer files encoding the kinoform. Each kinoform representation is preferably generated by superposing the kinoforms for each point source of the object to be imaged. Typically, the kinoform representations are converted to binary representations by a thresholding process. Although typically each of the first kinoform representation and the second kinoform representation is a binary kinoform representation (and therefore each resulting kinoform diffractive structure is a binary kinoform diffractive structure), in some embodiments, one kinoform representation may be a binary representation, and one kinoform representation may be a multi-level representation.

The length or width of the "full" kinoform representations (when formed as a kinoform diffractive structure) is typically between 2 millimetres and 30 millimetres.

The portions of the first and second kinoform representations are typically combined into a print file in order to form the diffractive structure.

The diffractive structure is typically generated in a single writing step. The diffractive structure is preferably formed in the carrier layer using maskless lithography such as electron beam lithography or direct laser writing. These techniques are capable of producing diffractive structures with grating spacings of less than 0.5 microns. Typically, a maximum grating spacing (or "fineness") of the kinoform diffractive structures is greater than or equal to 3 microns, preferably greater than or equal to 5 microns. Typically, a minimum grating spacing (or "fineness") of the kinoform diffractive structures is less than or equal to 0.6 microns, preferably less than or equal to 0.5 microns. The fineness—or "pitch"—of the kinoform diffractive structures (e.g. the scale of the structure and the structure distribution) is determined as a result of the calculation geometry of the desired image replay. For example, the object to be imaged, its dimensions, its distance from the hologram plane and the dimensions of the hologram area to expose are typically preselected, with the "pitch" of the kinoform diffractive structure resulting from the preselected geometry. In general, for a given hologram and object dimension, the closer the object is to the hologram plane, the finer the finest structure of the kinoform diffractive structure.

The diffractive structure may be written directly into a carrier layer provided on a device substrate in order to form the optical device directly. More typically however, the diffractive structure may be used to form a replication tool for mass production of optical devices.

Preferably a reflection enhancing layer is applied so as to follow the contours diffractive structure of the device. The surface relief of the diffractive structure may have different profiles, such as a sinusoidal, rectangular or triangular profile. The type of surface relief profile may affect diffraction efficiency. Typically the profile depth of a surface relief defining the grating elements is no greater than 1 micron, preferably no greater than 0.5 microns.

The portion of each kinoform representation is typically selected from a "full" kinoform representation of the respective image that may be either pre-formed or generated as required. The selection of each portion from a provided "full" kinoform representation advantageously allows increased flexibility in the formation of the optical devices, as particular portions of the respective kinoform representations may be selected in accordance with the desired optical effect to be exhibited by the device. The selection of the portions of the first and second kinoform representations may be aided using exposure software that is capable of decoding, in the form of an image, the computer file encoding the "full" kinoform representation.

Thus, in embodiments, the step of providing the portion of the first kinoform representation comprises providing a first kinoform representation encoding the first image, and selecting a portion of said first kinoform representation; and the step of providing the portion of the second kinoform representation comprises providing a second kinoform representation encoding the second image, and selecting a portion of said second kinoform representation. However, it is envisaged that in some embodiments, the portions of the first and second kinoform representations may be generated directly (i.e. without first forming the "full" representation).

The portion of the first kinoform diffractive structure and the portion of the second kinoform diffractive structure are preferably (e.g. selected) such that at least at one viewing angle, the first image is perceived to be on one side of the plane of the optical device, and the second image is perceived to be on the opposing side of the plane of the optical device. The portion of the first kinoform diffractive structure and the portion of the second kinoform diffractive structure are preferably (e.g. selected) such that upon tilting the device, the first image and the second image are perceived to move in substantially opposing directions when the device it tilted about at least one axis.

Although the first and second kinoform representations are typically in the form of computer files as discussed above, they may alternatively be in the form of physical diffractive structures. The diffractive structure may then be formed by providing (e.g. selecting) portions of the physical diffractive structures.

Preferably, the first diffractive region and the second diffractive region abut each other. In some alternative embodiments, the first diffractive region and the second diffractive region may be laterally spaced apart. In such embodiments, the method may further comprise providing a non-diffractive component located between the first diffractive region and the second diffractive region, preferably wherein the non-diffractive component is contiguous with each of the first diffractive region and the second diffractive region.

Preferably, each of the first diffractive region and the second diffractive region has a size greater than 150 microns. More typically, each of the first diffractive region and the second diffractive region has dimensions greater than 1 millimetre×1 millimetre, preferably wherein each of the first diffractive region and the second diffractive region has dimensions within the range of 10 $mm^2$ to 300 $mm^2$.

As discussed above, the present invention lends itself well to the use of computer generated holography ("CGH") techniques. Typically, the portion of the first kinoform representation and the portion of the second kinoform representation are computer generated. However, it is envisaged that classical holography techniques may be employed to generate an optical device according to the invention. The first kinoform representation may be holographically generated by exposing a recoding medium layer to a light interference pattern from a first image object; and the second kinoform representation may be holographically generated by exposing a recoding medium to a light interference pattern from a second image object. The portions of the generated "classical" kinoform diffractive structures may then be selected to form the diffractive structure in the manner discussed above.

In embodiments one or more further portions of respective further kinoform representations may be provided such that the formed optical device comprises three or more diffractive regions corresponding to respective portions of "full" kinoform representations.

Particularly preferably, the optical device of the present invention is a security device. In other words, the security device may be used to prevent copying or counterfeiting of an article or document to which it is applied. Typically, a "security device" is not possible to reproduce accurately by taking a visible light copy, e.g. through the use of standard available photocopying or scanning equipment.

In accordance with a third aspect of the invention we provide a security article comprising a security device according to the invention, wherein the security article is preferably formed as a security thread, strip, foil, insert, patch, or substrate for a security document.

In a further aspect of the invention we provide a security document comprising a security device or a security article according to the invention, the security document preferably comprising a banknote, cheque, passport, identity card, certificate of authenticity, fiscal stamp or another document for securing value or personal identity. Typically, the security document comprises a substrate with a transparent window portion and the security device or security article is located at least partially within the transparent window portion.

BRIEF DESCRIPTION OF THE DRAWINGS

Exemplary embodiments of the invention will now be described, by way of example only, with reference to the appended drawings, in which.

DETAILED DESCRIPTION

Figure 1:
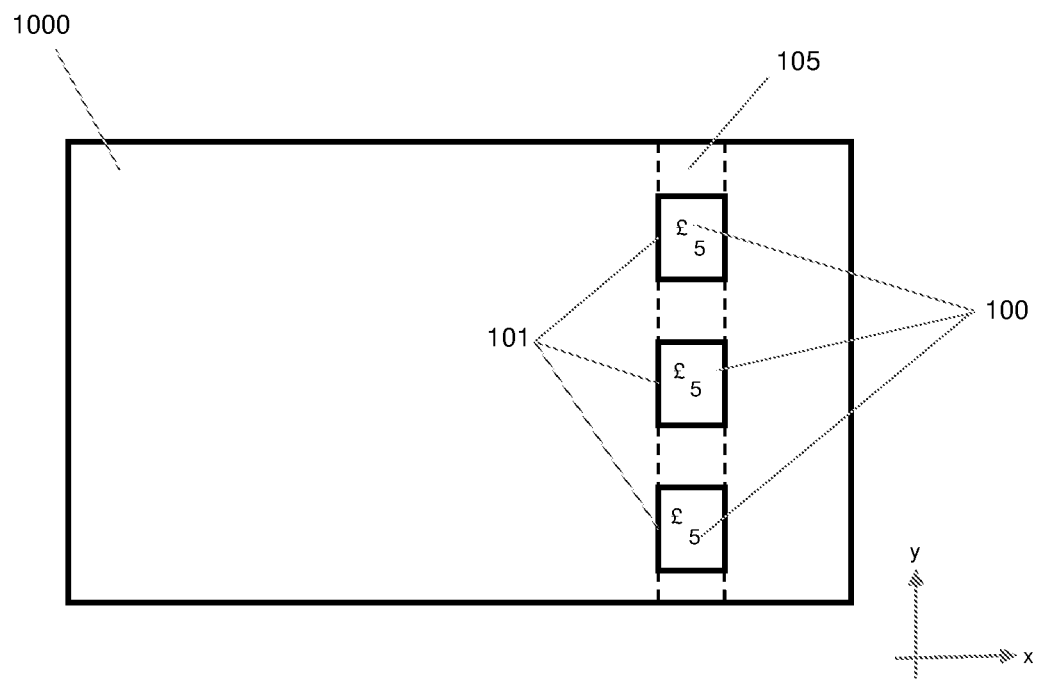
FIG. 1 is a plan view of a security document carrying a plurality of optical devices according to the invention.

FIG. 1 is a plan view of a security document 1000 comprising a plurality of optical devices 100 according to the invention. Here, the optical devices 100 are used to increase the security level of the document (here, a banknote), and are therefore security devices. The security devices 100 are provided on a security thread 105 which is integrated within the document substrate, and are visible within windowed regions 101 of the document substrate. Each security device 100 is in register with a corresponding windowed region so as to be visible. The document substrate may be a fibrous substance such as paper, or may be in the form of a polymer substrate.

In this example, each security device 100 provided on the thread 110 is substantially the same such that they each exhibit substantially the same variable optical effect. Each device exhibits two images in the form of alphanumeric characters or symbols (here, a "£" symbol and a "5" character) that are perceived to move relative to each other on a change of viewing angle. The devices 100 of the banknote 1000 are typically viewed within a viewing plane that intersects the document (and therefore each device) along a line parallel with the y-axis. A change of viewing angle may be achieved by tilting the security document relative to the observer about a tilt axis parallel with the x-axis ("vertical", or "north-south") tilting and/or about a tilt axis that lies parallel with the y axis ("horizontal" or "east-west" tilting).

In more detail, upon vertical tilting, the two symbols are perceived to move in opposing directions along the vertical (y) axis. Similarly, the two symbols are perceived to move in opposing directions along the horizontal (x) axis upon horizontal tilting. Furthermore, in this example embodiment, the two symbols are perceived to be located in respective image planes on opposing sides of the plane of the optical device. For example, at one viewing angle, the "£" symbol is perceived to lie within an image plane that is behind the plane of the device with respect to the viewer, and the "5" is perceived to lie within an image plane that is in front of the plane of the device with respect to the viewer. At a second, different viewing angle, the respective depths of the replayed images are reversed such that the "£" symbol appears in front of the device plane, and the "5" character appears behind the device plane.

Before describing the security device 100 of the invention in more detail, we first consider the principles behind the variable optical effect that is generated by the device.

Figure 2A:
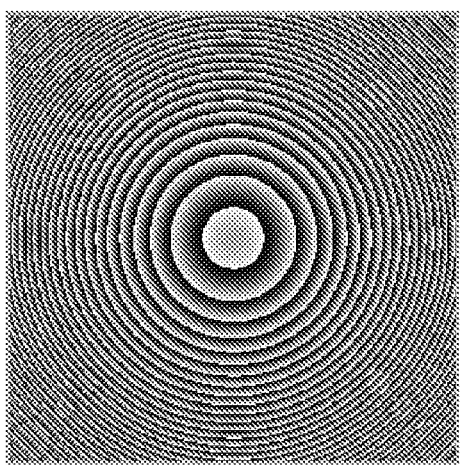
FIG. 2(a) illustrates the kinoform of a single point object.
Figure 2B:
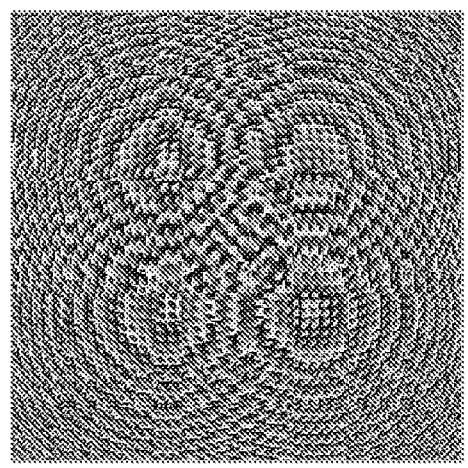
FIG. 2(b) illustrates the kinoform of a plurality of point objects arranged in a square pattern.
Figure 2C:
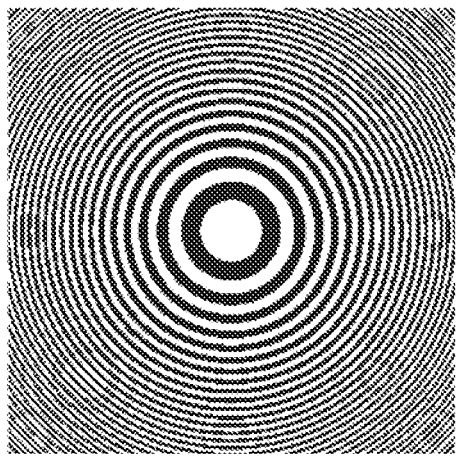
FIG. 2(c) illustrates the binary kinoform of a single point object.
Figure 2D:
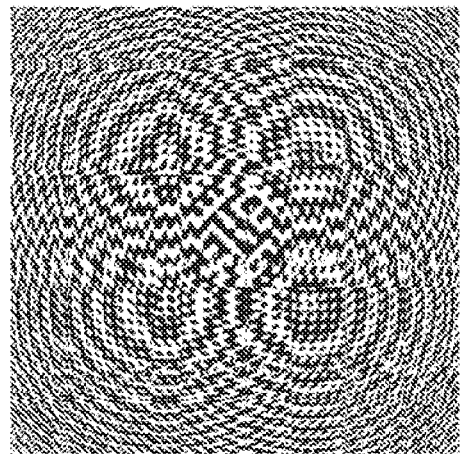
FIG. 2(d) illustrates the binary kinoform of a plurality of point objects arranged in a square pattern.

The kinoform of a single point object ("point source") has the form of a Fresnel lens. The kinoform diffractive structure is a multi-level structure, and is shown in FIG. 2(a). Due to the multi-level structure, the image of the kinoform resembles a greyscale image. The binary kinoform diffractive structure of the single point object has the form of a Fresnel Zone Plate, and is illustrated in FIG. 2(c). FIG. 2(b) illustrates the multi-level kinoform diffractive structure of four point objects arranged in a square pattern. Although the kinoform of FIG. 2(b) is substantially more complex than the kinoform diffractive structure of the single point object shown in FIG. 2(a), we can still recognise this to be the superposition of four single point kinoforms. The binary kinoform diffractive structure of the four point objects is illustrated in FIG. 2(d). The binary kinoforms are typically generated by performing a thresholding process on the multi-level kinoforms. Binary kinoform diffractive structures are preferentially used in the present invention.

Figure 3A:
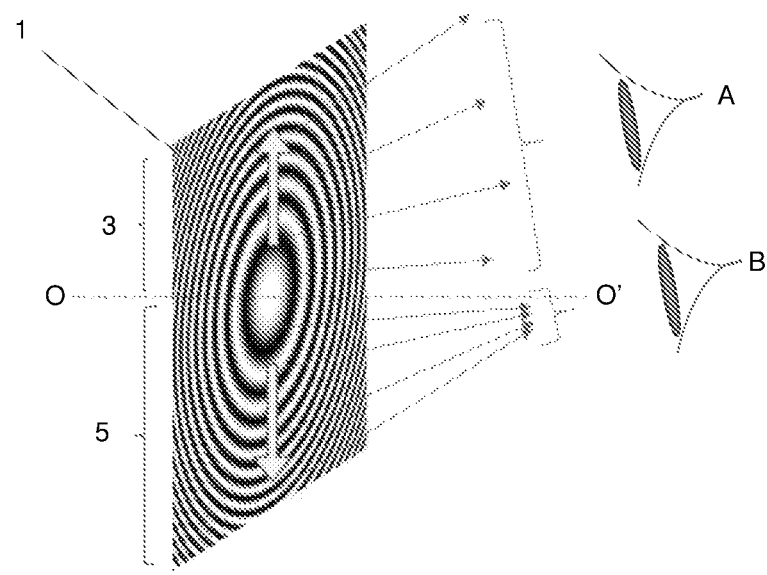
FIG. 3(a) schematically illustrates the variable optical effect perceived when viewing a kinoform diffractive structure in the upper parallax view.

FIG. 3(a) schematically illustrates the visual effect observed when illuminating a kinoform diffractive structure 1 in the form of a Fresnel zone plate (i.e. a binary kinoform of a single point object). The structure 1 is illuminated along a direction parallel to its plane normal (i.e. along O-O') and viewed at viewing angles in the upper parallax view.

Light incident at radially outer sections of the diffractive structure is diffracted through a greater angle than light incident on the centre due to the differences in grating pitch. Thus, when observing the top half 3 of the kinoform diffractive structure 1 in the upper parallax view (viewing position A), the diffracted light diverges towards the viewer and forms a virtual image behind the plane of the diffractive structure. Therefore, the locus of eye movement creates the perception of a focussed light spot moving behind the plane of the zone plate 1. In contrast, when observing the bottom half 5 of the diffractive structure in the upper parallax view (viewing position B), light is focussed to form a real image in front of the plane of the structure. Thus, changing viewing angle in the upper parallax view when viewing the bottom half 5 of the diffractive structure generates the perception of a focussed light spot moving in front of the plane of the diffractive structure 1.

Furthermore, as well as the light spots being perceived to be on opposing sides of the plane of the structure 1, the focussed images are perceived to move in opposing directions upon changing the viewing angle. This is represented by the opposing arrows illustrated on the Fresnel structure 1. Due to the symmetry of the zone plate structure, the perceived images will move in opposing directions corresponding to the direction of tilt. For example, upon vertical tilting, the replayed light spots will appear to move in opposing directions along the vertical axis (as indicated by the opposing arrows). Similarly, on horizontal tilting, the light spots will appear to move in opposing directions along the horizontal axis. When the structure is tilted in more complex manner comprising components of both vertical and horizontal tilting, the light spots will appear to move in opposing curved trajectories orbiting the central point of the structure.

Here, when referring to the "upper parallax view", we mean that the viewing angles (measured with respect to the direction of specular reflection—in this case along O-O') are positive, or "above" the specular direction, such that +1 order diffraction effects are observed.

Figure 3B:
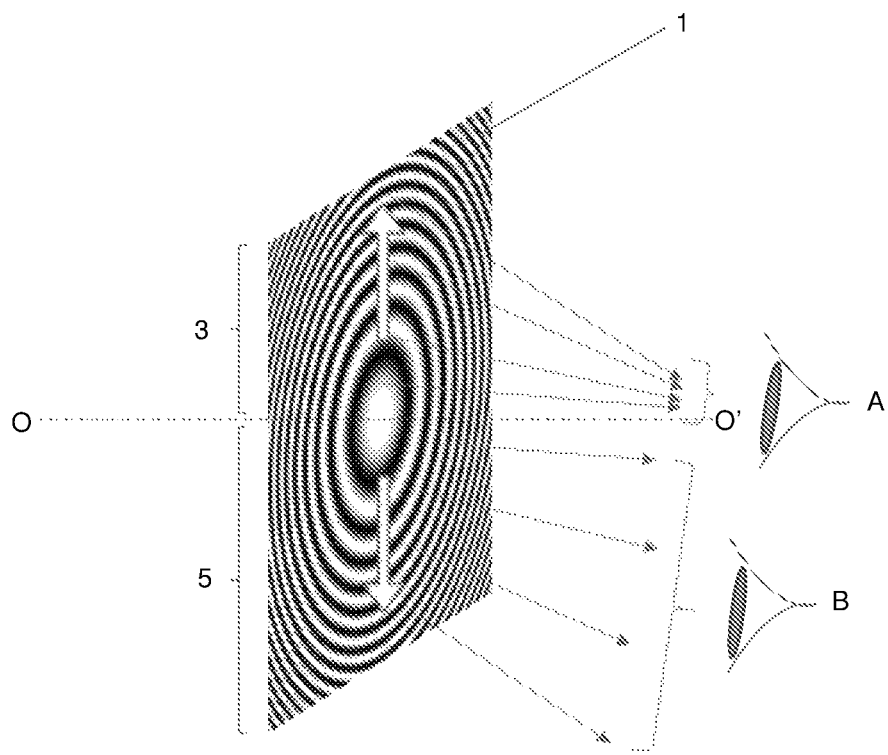
FIG. 3(b) schematically illustrates the variable optical effect perceived when viewing a kinoform diffractive structure in the lower parallax view.

FIG. 3(b) schematically illustrates the perceived optical effect when viewing the zone plate diffractive structure 1 in the "lower parallax view", in which the viewing angles are negative, or "below" the specular direction, such that the −1 order diffraction effects are observed. When viewing the top half of the structure 1 (viewing position A) the locus of movement creates the perception of a focussed light spot moving in front of the plane of the structure. In position B when observing the bottom half of the diffractive structure 1, the movement of the eye generates the optical effect of a virtual image of a light spot moving behind the plane of the lens 1.

Figure 4A:
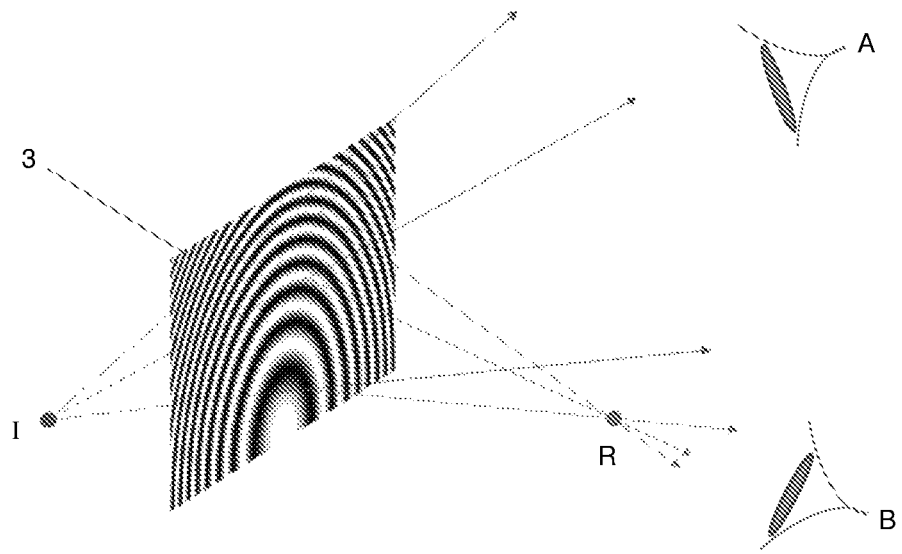
FIGS. 4(a) and 4(b) schematically illustrate the variable optical effect perceived when viewing top and bottom portions of a full kinoform diffractive structure.

FIG. 4(a) schematically illustrates the visual effect generated by viewing the upper half 3 of the diffractive structure in both the upper parallax view (positon A) and the lower parallax view (position B) under illumination along the plane normal of the device. In the upper parallax view, a virtual image I generated by the +1 order diffraction is visualised behind the plane of the structure. Conversely, in the lower parallax view, a real image R is generated by the −1 order diffraction, and appears to "float" in front of the plane of the structure.

Figure 4B:
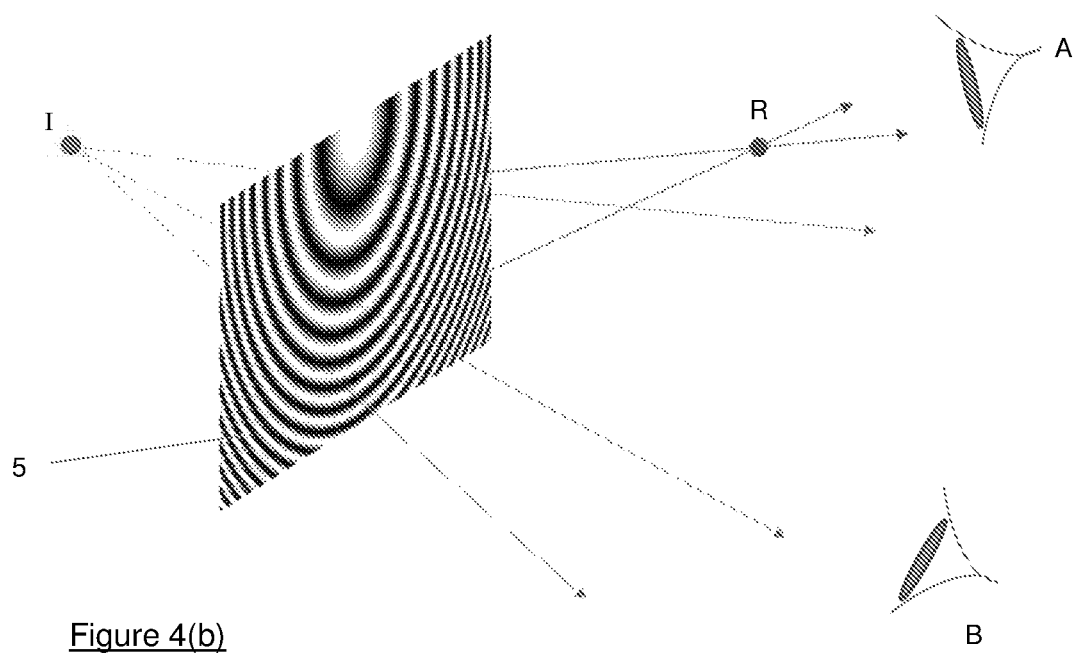

In a similar manner, when viewing the bottom half 5 of the diffractive structure 1 (as illustrated in FIG. 4(b)), a virtual image I is perceived behind the plane of the structure when in the lower parallax view (position B), and a real image R is perceived in front of the plane of the structure when viewed in the upper parallax view (position A).

These principles described above may be used to discuss the optical effect generated by the security device of the present invention.

Figure 5:
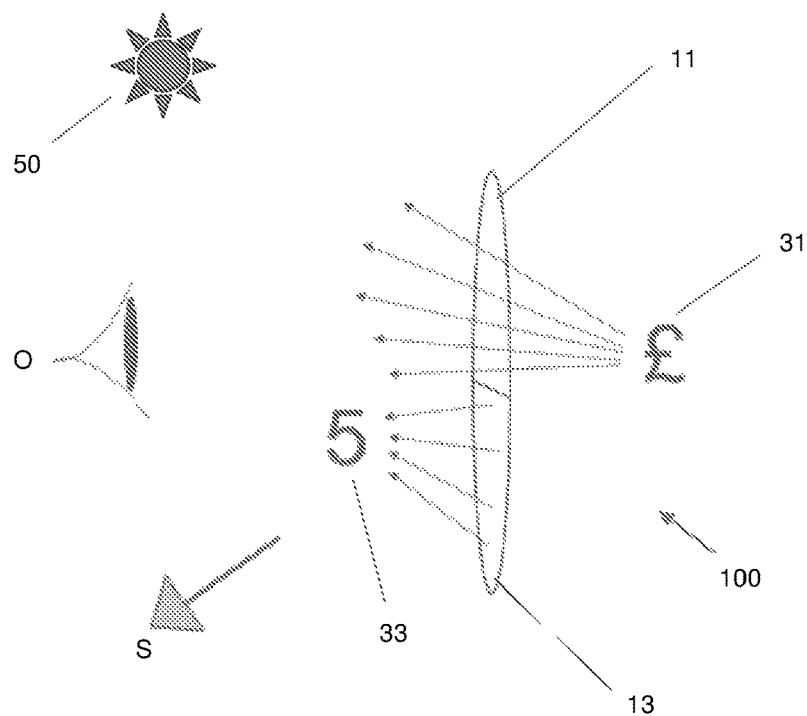
FIG. 5 schematically illustrates an optical device according to an embodiment of the invention, and the exhibited variable optical effect.
Figure 6:
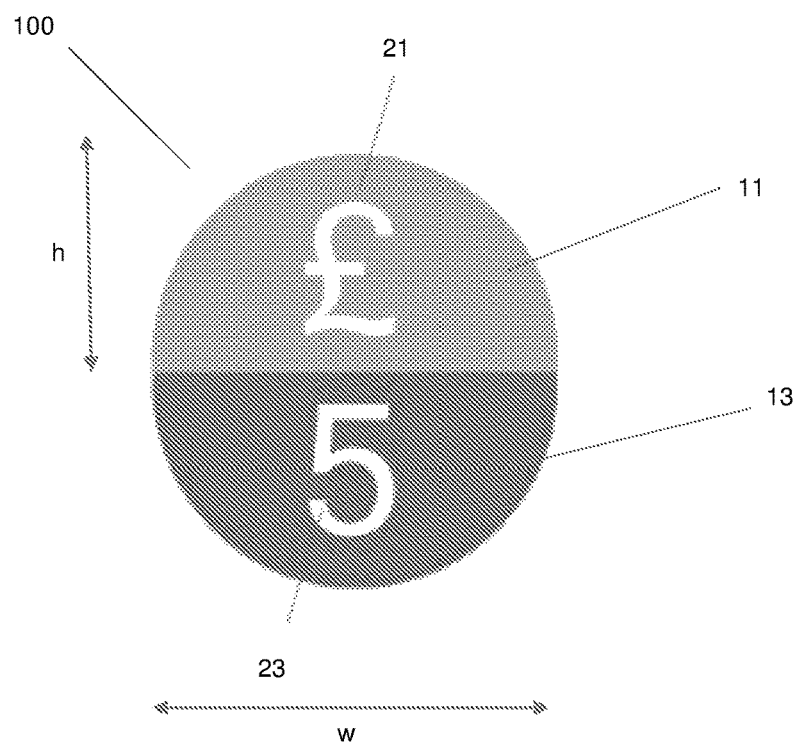
FIG. 6 is a schematic plan view of the optical device depicted in FIG. 5.

FIG. 5 schematically illustrates a device 100 according to an embodiment of the invention, together with the perceived optical effect. The device comprises a diffractive structure having a first diffractive region 11 and a second diffractive region 13. In this example, the two diffractive regions 11, 13 abut one another in a vertical direction (i.e. so that they share a common edge along a direction orthogonal to the vertical direction), as shown in FIG. 6 which is a plan view of said device. In this way, the first and second diffractive regions 11, 13 may be described as contiguous.

The first diffractive region 11 is in the form of a portion of a "full"—or "complete"—kinoform diffractive structure that encodes a first image, in this case a "£" symbol. The second diffractive region 13 is in the form of a macroscopic portion of a "full" kinoform diffractive structure that encodes a second image, in this case a "5" character. In other words, each diffractive region is formed of a sub region of the full kinoform diffractive structure. Such a portion of a "full" kinoform will replay the full image, but with different viewing conditions depending on the selected portion. In the example of FIG. 5, the portions of the respective "full" kinoform diffractive structures used for the first and second diffractive regions are chosen such that for a particular viewing angle, the relative depths of the two replayed images are such that one of the images is in front of the plane of the device, and the other image is behind the plane of the device. In this example, binary kinoform diffractive structures are used.

For ease of description, we consider the first diffractive region 11 to be formed from the top half of a full kinoform encoding the "£" symbol, and the second diffractive region 13 to be formed from the "bottom" half of a full kinoform encoding the "5" character. Thus, the overall optical effect generated by the device 100 may be considered with reference to FIGS. 4(a) and 4(b) discussed above.

We can now consider the overall optically variable effect exhibited by the device 100. When illuminated by an illumination source 50 and viewed by an observer O above the specular reflection direction (indicated at S), the viewer perceives an image of the "5" appearing to float in front of the plane of the device 100, and an image of the "£" symbol behind the plane of the device 100 due to +1 order diffraction of the incident light from the respective diffractive regions 11, 13. Upon tilting the device 100, the "5" and "£" symbols are perceived to move in opposing directions to each other, as illustrated in FIGS. 7 and 8.

Figures 7A, 7B:
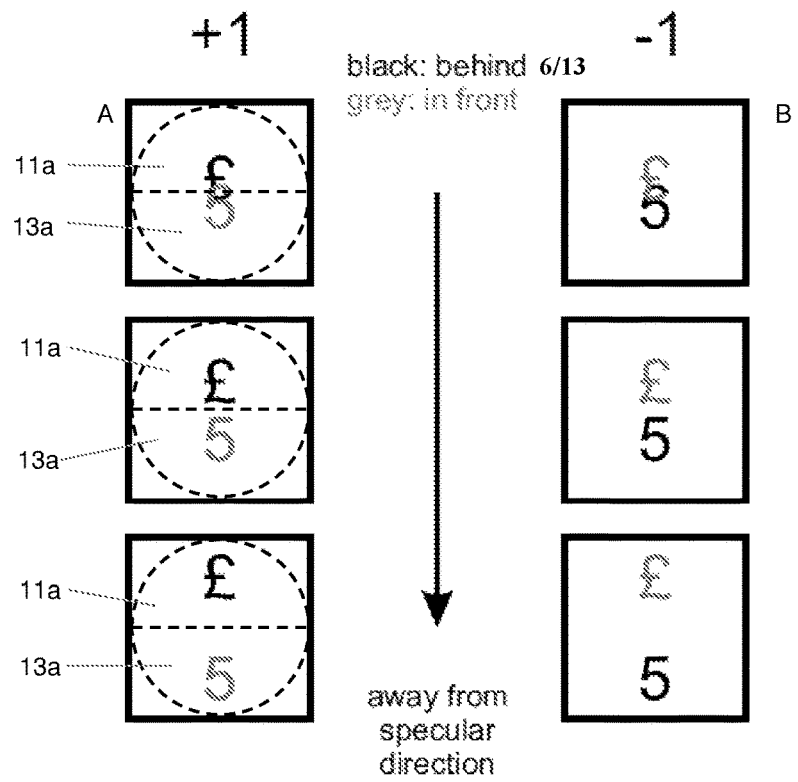
FIGS. 7 and 8 illustrate the variable optical effect exhibited by the optical device depicted in FIGS. 5 and 6 upon tilting.

FIGS. 7(*a*) and 7(*b*) schematically illustrate the perceived variable optical effect exhibited by the device 100 under vertical ("North-South") tilting and viewing in a viewing plane that intersects the device along the y-axis in the geometry of FIG. 1. FIG. 7(*a*) illustrates the case when the viewing angle is above the specular direction as in FIG. 5 (and so the +1 diffraction order effects are viewed), and FIG. 7(*b*) illustrates the case when the illumination and tilting is such that the viewing angle is below the specular direction (and so the −1 diffraction order effects are viewed). As illustrated in FIG. 7(*a*), as the device 100 is tilted away from the specular reflection (zero order) direction, the "£" and "5" images move apart in opposing directions along the vertical axis. In this instance, the "5" appears in front of the plane of the device 100, and the "£" appears behind the plane of the device 100.

When the device is tilted vertically such that the viewing angle is below the zero order direction, the replayed images move in opposing directions to each other along the vertical axis with the same rates of movement as for the +1 order diffraction. However, under these viewing conditions, the relative depths of the images are reversed, with the "£" symbol appearing to float in front of the plane of the device, and the "5" character appearing behind the device plane. In other words, the movement of the images is symmetrical relative to the specular direction; only the perceived "depth" of the symbols reverses as the diffraction order changes from the +1 order to the −1 order.

Figures 8A, 8B:
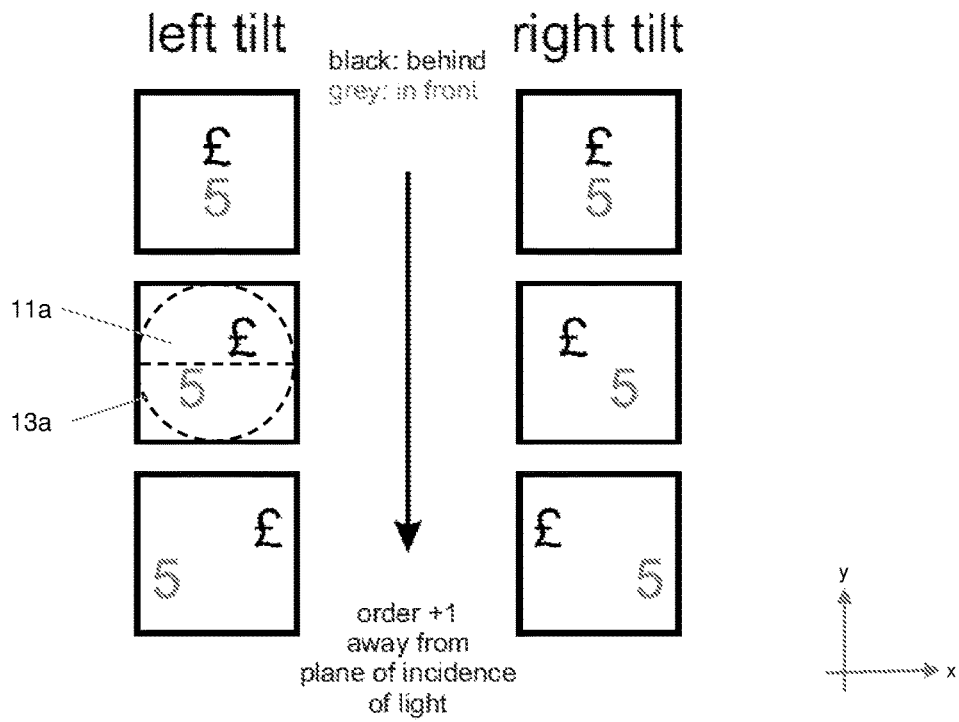

FIGS. 8(*a*) and 8(*b*) schematically illustrate the perceived relative movement of the two replayed images when the device is tilted horizontally ("East-West" tilting), and again viewed within a viewing plane that intersects the device along the y-axis. As shown in FIG. 8, the two symbols move apart in opposing directions as the device is tilted away from the plane within which light is incident on the device. In the view of FIGS. 8(*a*) and 8(*b*), the vertical tilt of the device is such that the +1 order diffractive effects are replayed, and therefore the "£" symbol appears behind the plane of the device, and the "5" image appears to float in front of the device plane. The perceived depths of the replayed images do not change on East-West tilting as the diffraction effects remain of the +1 order. However, if the device is vertically tilted such that the −1 diffraction orders effects are exhibited, the perceived depths of the "£" and "5" symbols will reverse.

In this way, the device of the present invention exhibits a full parallax variable optical effect upon a change of viewing angle. If the device is tilted in a more complex manner with components of both vertical and horizontal tilting, the replayed images are perceived to move in opposing curved (e.g. circular) trajectories.

As can be seen from FIGS. 7 and 8, the movement of the replayed images of the "£" and "5" symbols are constrained within respective image areas corresponding to their respective diffractive regions 11, 13 as illustrated in FIG. 6. In other words, in this example, the "£" symbol is replayed within an image area 11*a* corresponding to the top half of the device, and the "5" character is perceived to move only within an image area 13*a* corresponding to the bottom half of the device. We can see that in FIGS. 7(*a*) and 7(*b*), the "£" symbol is only able to move vertically within the upper half of the viewing area, and conversely the replayed "5" is vertically constrained within the lower half of the viewing area. However, on horizontal tilting as illustrated in FIGS. 8(*a*) and 8(*b*), both the "£" and "5" images are able to move across the complete width of the viewing area, in line with the arrangement of the diffractive regions 11, 13 of the device. For increased ease of understanding, the images areas 11*a*, 13*a* have been schematically illustrated in dashed lines in some of the views illustrated in FIGS. 7 and 8.

When an image is perceived to move towards the boundary of its respective diffractive region, the replayed image becomes truncated. However, as the image is truncated at the edge of its diffractive region, a part of the image from the opposing order of diffraction is replayed, again truncated at the boundary. This can be seen in FIG. 7(*a*) when viewing close to the specular reflection direction (view A). When tilting towards the specular direction, the top of the "5" character (which appears in front of the plane) is truncated as the "5" moves towards the boundary between image areas 11*a*, 13*a*, with the bottom part of the "5" appearing in the other diffraction order (and hence perceived to be behind the plane of the device). Similarly, as the "£" symbol is perceived to move towards the centre of the device (appearing behind the plane), the bottom of the "£" becomes truncated, with the top part of the "£" appearing in front of the plane of the device. This may provide the visual impression of the images overlapping depending on their shapes, as seen in view A of FIG. 7(*a*). Similarly, in view B of FIG. 7(*b*), the "£" and "5" appear to overlap due to the replay of a further part of each image, even though they remain in their respective image areas 11*a*, 13*a*.

Figure 9:
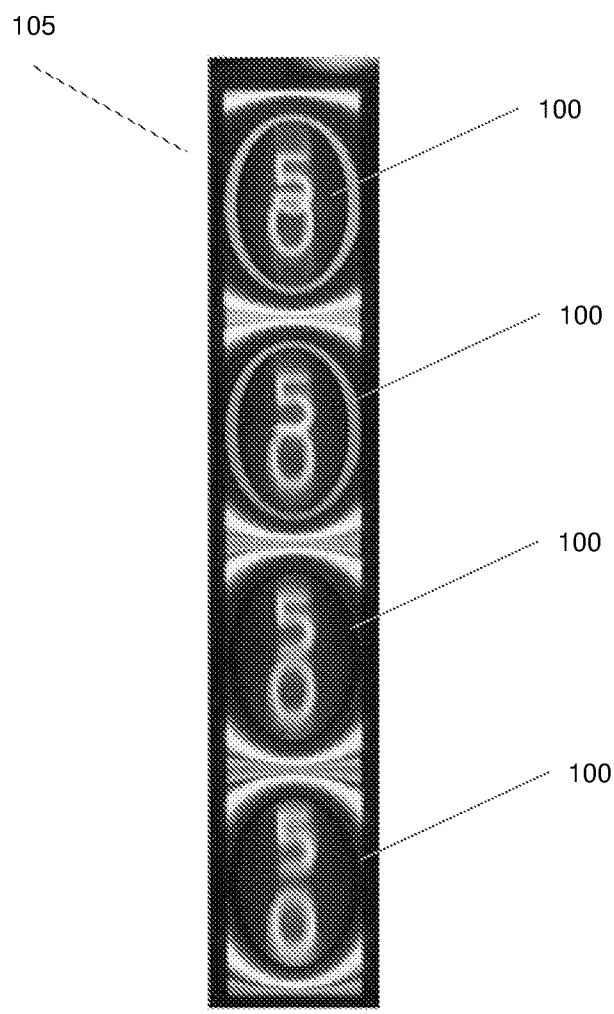
FIG. 9 illustrates a security article in the form of a security thread carrying multiple optical devices according to the invention.

FIG. 9 illustrates a security thread 105 comprising four substantially identical security devices 100, each being viewed at a slightly different viewing angle upon vertical tiling and therefore replaying different relative positionings of the replayed images (in this case a "5" character and a "0" character). The replay of the four devices 100 in FIG. 9 illustrates the relative movement of the symbols upon N-S tiling of the security devices. The security thread of FIG. 9 is illuminated by diffuse light, and hence there is some "blurring" of the replayed images since multiple areas of the device replay at the same time for a particular viewing angle. Under illumination by collimated (or "spot") light, the replayed images will appear sharper since multiple areas do not replay simultaneously. In the top view of FIG. 9, the "5" and "0" appear to partially overlap for the reasons discussed above in relation to FIGS. 7(*a*) and 7(*b*). In other words, as each character moves towards the edge of its respective image area, it becomes truncated with a part of the other diffraction order of each character replaying. However, each image is replayed within its respective image area.

Referring back to FIG. 6, each diffractive region 11, 13 is a continuous region, in that it is not interrupted across its domain. Thus, each of the portions of the respective "full" kinoform diffractive structures that are used to form the diffractive regions of the device are continuous portions.

The diffractive portions 11, 13 of the device 100 are macroscopic, in that they are visible by the unaided human eye. Each diffractive portion 11, 13 preferably has a minimum dimension (e.g. "height" h in FIG. 6) of at least 500 microns, more preferably at least 1 mm. Typical minimum dimensions, h, for a diffractive portion are in the range of 5 mm to 10 mm. Thus, the "width" w of the device 100 in FIG. 6 may typically be in the range of 10 mm to 20 mm. By using macroscopic diffractive regions in the manner of the present invention, the replayed images advantageously have a high brightness. Furthermore, the ease of manufacture of such devices is increased when compared to interlacing different diffractive structures, for example.

Figure 10A:
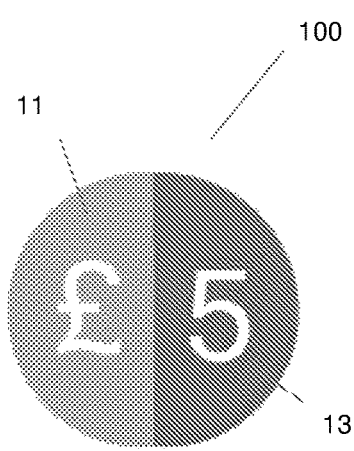
FIGS. 10(a) and 10(b) are schematic plan views of security devices according to embodiments of the invention.
Figure 10B:
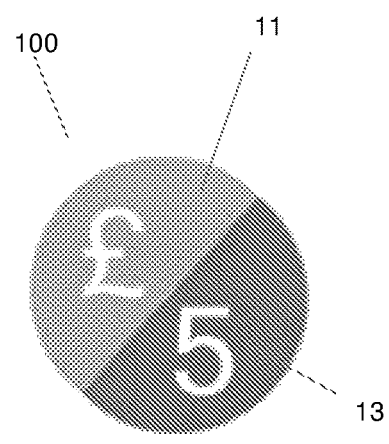

In the example device 100 discussed with reference to FIGS. 5 to 9, the first and second diffractive regions are formed as the top and bottom portions of the respective full kinoforms. However, different portions of the respective full kinoforms may be used in order to achieve different parallax and kinematic effects. This is schematically illustrated in FIGS. 10(a) and 10(b). In the device 100 illustrated in FIG. 10(a), the first diffractive region 11 is formed from the "left" portion of the full kinoform, and the second diffractive region 13 is formed from the "right" portion of the respective kinoform. In the device 100 schematically shown in FIG. 10(b), the upper left and lower right portions of the respective full kinoforms are used for the first and second diffractive regions 11, 13. When illuminated, the devices schematically illustrated in FIGS. 10(a) and 10(b) will both exhibit full parallax effects, with the "£" and "5" symbols perceived to be at different depths with respect to the plane of the device for a particular viewing angle. However, the movement of each replayed image will be constrained within its respective image area corresponding to the arrangement of its respective diffractive region. More specifically, when the device 100 of FIG. 10(a) is illuminated, both the "£" and "5" will be perceived to exhibit full vertical movement across the viewing area, but the "£" will be constrained to the left hand side of the viewing area and conversely the "5" will be constrained to move within the right hand side of the viewing area. Similarly, when viewing FIG. 10(b), the "£" symbol will be constrained to the top left area of the viewing portion, with the motion of the "5" limited to the bottom right area, in correspondence with the arrangement of the diffractive regions.

Thus, the selected portion of the "full" kinoform used to form each diffractive region defines the relative motion and depth of the replayed images, and the arrangement of the diffractive regions defines the areas within which the replayed images are perceived to move upon a change in viewing angle.

Figure 18:
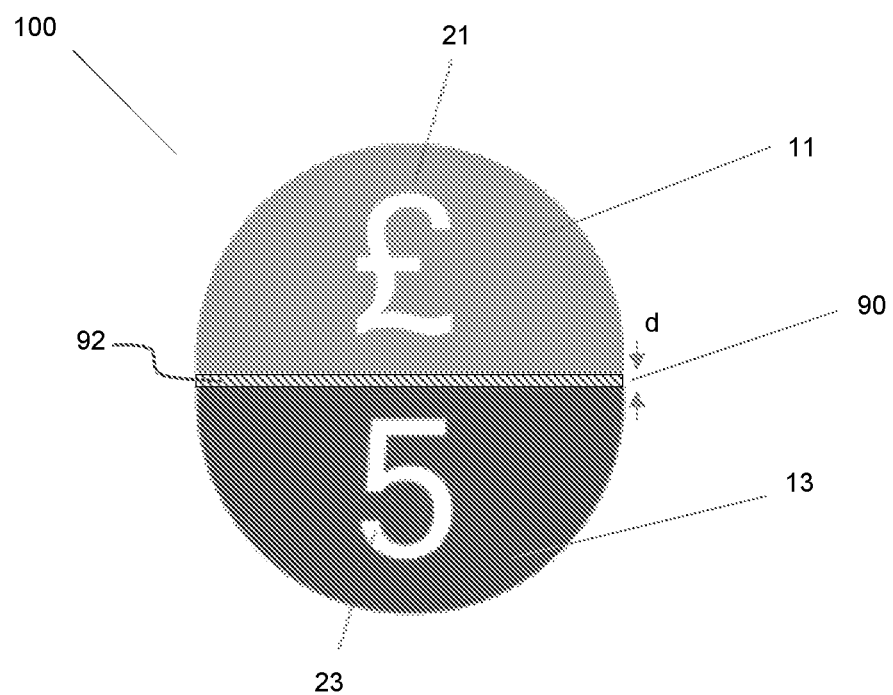
FIG. 18 is a schematic plan view of a device according to a further embodiment of the invention.

FIG. 18 is a schematic plan view of a device 100 according to a further embodiment of the invention. The device of FIG. 18 is similar to the device depicted in FIG. 6; however, here the two diffractive regions 11, 13 are laterally spaced apart. In other words, the two diffractive regions are not contiguous, and the device comprises a "gap region" 90 between the diffractive regions 11, 13. In this embodiment, the gap region 90 comprises a planar polished metal component 92 located so as to substantially fill the gap region. Thus, the metal component 92 is contiguous with each of the diffractive regions 11, 13. The metal component 92 is planar in that it does not comprise a surface relief structure, and is therefore non-diffractive. Although in this embodiment a planar metallised component is situated within the gap region, alternative non-diffractive components may be positioned within the gap region 90, for example an ink working. Although the gap region typically comprises a non-diffractive component, in some embodiments the gap region may be absent of such a non-diffractive component.

In such embodiments, typical dimensions of the gap region (e.g. the distance between the diffractive regions, d) are typically greater than 2 µm (so as not to generate diffractive effects) and less than 100 µm, typically between 5 µm and 50 µm.

In the examples discussed thus far, the selected portions of the full kinoform diffractive structures are complementary, in that the perceived relative depths of the replayed images, and their relative motions substantially oppose each other. For example, in the described embodiments, the device has comprised a top portion of one kinoform diffractive structure and a complementary bottom portion of a different kinoform structure; or comprised left and right portions of the respective full kinoform structures. However, in alternative embodiments, the selected portions of the respective kinoform diffractive structures may be corresponding portions; for example the device may comprise two top halves of respective "full" kinoform diffractive structure, or two left halves of the respective "full" kinoform diffractive structures. In such embodiments where corresponding portions are used, the relative kinematic and depth effects of the replayed images will be substantially similar (e.g. both images will appear to be on the same side of the plane of the device and move in the same direction upon tilting), but the perceived distance between the images and the plane of the device, and/or their rate of movement may differ.

Figure 11:
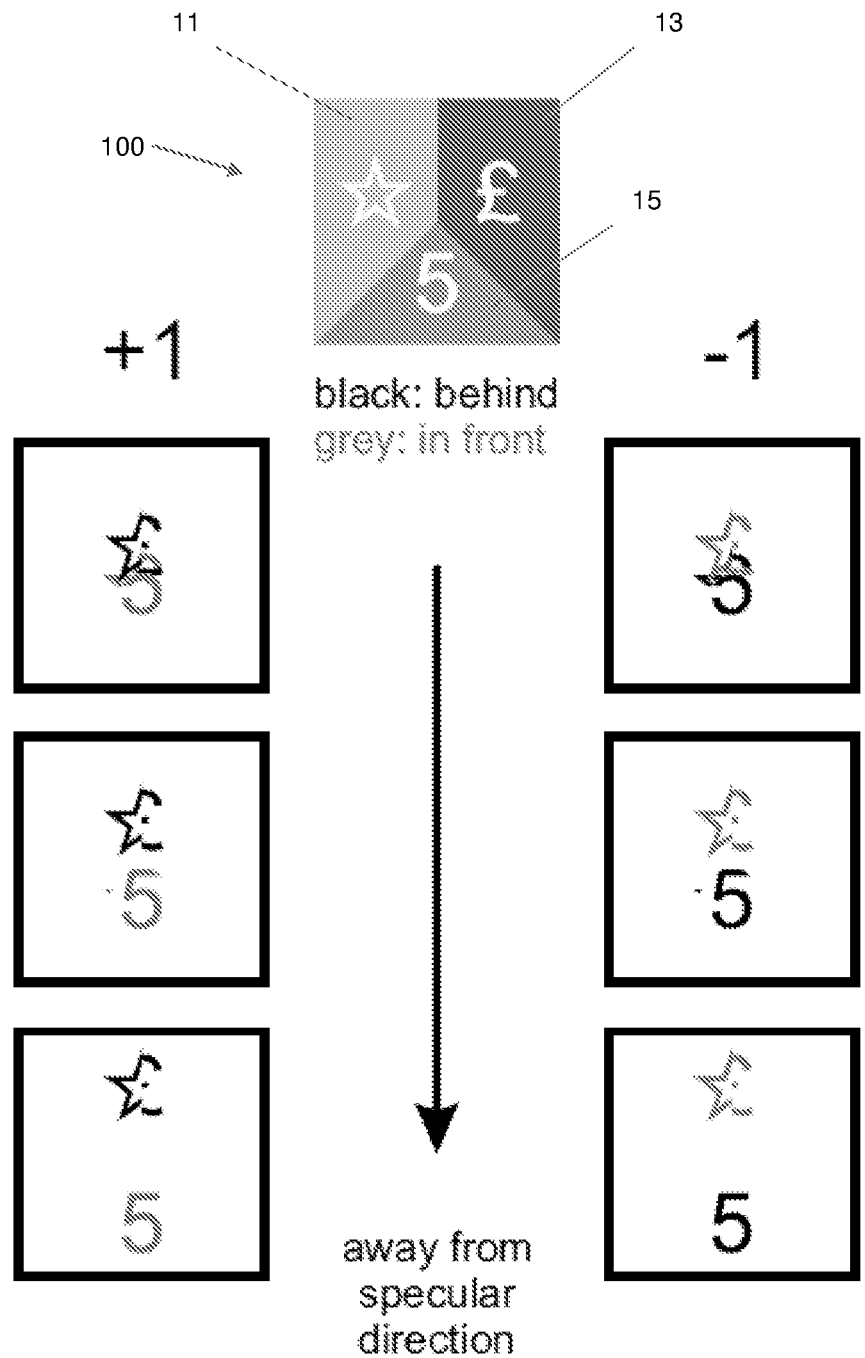
FIGS. 11 and 12 illustrate an optical device according to an embodiment of the invention and the variable optical effect exhibited upon vertical and horizontal tilting.
Figure 12:
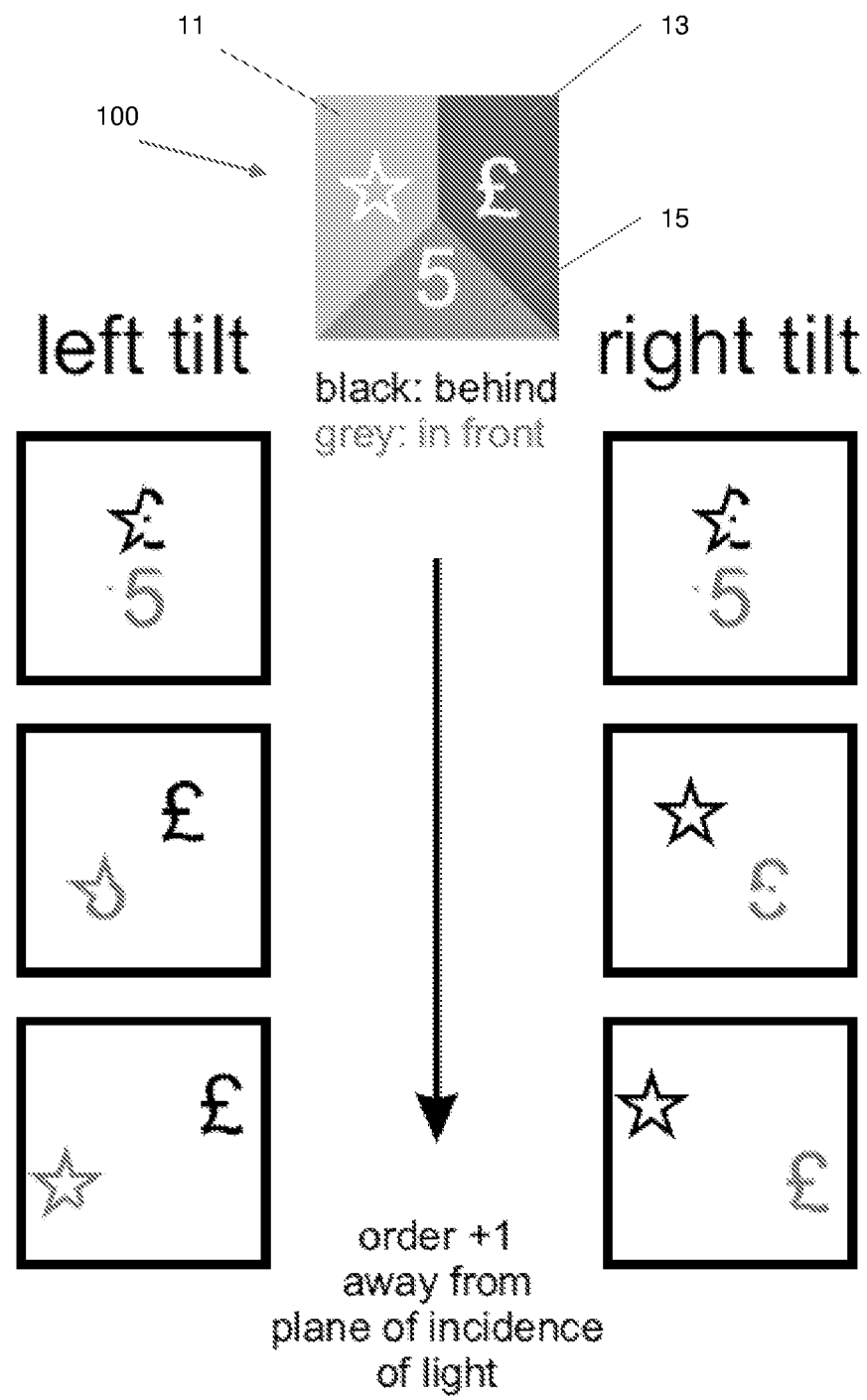

FIGS. 11 and 12 illustrate an example device 100 according to an embodiment of the invention, which comprises three diffractive regions 11, 13 and 15. First diffractive region 11 is a portion of a full kinoform diffractive structure encoding an image of a star; second diffractive region 13 is a portion of a full kinoform diffractive structure encoding an image of a "£" symbol, and third diffractive region 15 is a portion of a full kinoform diffractive structure encoding an image of a "5" character.

FIG. 11 schematically illustrates the optical effect exhibited on vertical "North-South" tilting of the device. When the device is viewed above the zero order direction (+1 order diffraction), the star and the "£" appear to move upwards and appear behind the plane of the device, with the "5" perceived to move in the opposing downwards direction and appearing to float in front of the plane of the device. When viewed below the zero order direction (−1 order diffraction), the relative motions of the three symbols is the same as for the +1 order, but with the relative depths reversed so that the star and the "£" appear in front of the plane of the device, and the "5" appearing behind the device. As can be seen in FIG. 11, each symbol is constrained to move within an area corresponding to the geometry of the diffractive region within which the portion of the respective "full" kinoform is arranged.

FIG. 12 schematically illustrates the optical effect exhibited on horizontal (left-right) tilting of the device comprising three diffractive regions. On left tilting, away from the plane of incidence of light, the star and the "5" character which are both perceived to be behind the plane of the device, more right. The "£" becomes fully visible, but the replayed image of the star behind the plane of the device disappears. However, due to the geometry of the diffractive region 11 (and thus the portion of the star's "full" kinoform diffractive structure), an image of the star appearing to float in front of the plane of the device appears in the bottom half of the device and moves left on further left tilting. The image of the "5" that floats in front of the device moves left and disappears from view upon left tilting as a result of the geometry of its diffractive region 15.

Conversely, on right tilting, the image of the star behind the plane of the device appears to move right, with the replayed image of the "£" behind the plane of the device disappearing. Due to the geometry of the diffractive region 13 (which is symmetrical with diffractive region 11), a real image of the "£" character in front of the plane of the device appears in the bottom half of the device and moves right. Again, due to the geometry of the diffractive region 15, the virtual image of the "5" behind the plane of the device begins to move right before disappearing on right tilting.

It will be appreciated that, in practice, the diffractive regions of the device will typically be a formed in the same manufacturing step (e.g. via a direct writing technique), such that the device 100 comprises a continuous diffractive structure that comprises the different grating regions. We now describe a preferred method of manufacturing an optical device according to the invention, with reference to the flow diagram illustrated in FIG. 13.

The process starts at step S101, where a first "full" kinoform representation encoding a first image (such as a symbol or alphanumeric character) is provided. The kinoform representation is a computer-generated representation encoding the first image, and may be pre-formed or generated as required. At step S102, a second full kinoform representation encoding a second image is provided. In the same manner as the first kinoform representation, the second kinoform representation is a computer generated representation that encodes the second image, different from the first image. The first and second kinoform representations are in the form of respective computer files encoding the respective images. The full kinoform representations are typically binary kinoform representations.

At step S103, a portion of the first kinoform representation is selected. The selected first portion is a macroscopic portion of the first kinoform representation, such that the selected portion will replay the entire first image when viewed (under at least some viewing conditions) in isolation, and wherein the first image replayed by the first portion will be perceived to either be in front of the plane of the device, or behind the plane of the device, dependent upon viewing angle.

At step S104, a portion of the second kinoform representation is selected. In the same manner as in step S103, the second portion is a macroscopic portion of the second kinoform in order that the second portion will replay the entire second image (under at least some viewing conditions) when viewed in isolation. The second portion is typically selected such that the position of the replayed second image with respect to the device will be complementary to the position of the replayed first image. In other words, the respective portions of the first and second full kinoform representations are selected such that, when viewing the device, the first and second images will be perceived to be on opposing sides of the plane of the device. For example, at one viewing angle, the first image will be perceived to "float" in front of the plane of the device, with the second image appearing behind the plane of the device; and at a second, different viewing angle the first image will be perceived to be behind the plane of the device with the second image floating in front of the plane.

In this way, the first and second images will appear to move in opposing directions upon tilting the device, thereby generating a striking effect that is straightforward to authenticate and yet difficult to replicate.

At step S105, the selected first and second portions are used to form a diffractive structure in carrier layer. The diffractive structure is typically formed using maskless lithography techniques such as such as electron beam lithography or direct laser writing. Computer software used to generate a print file for the lithography is used to arrange the first and second portions in corresponding first and second diffractive regions as desired, with the diffractive structure directly written in a single process step. The arrangement of the first and second diffractive regions is chosen dependent on the desired positioning of the replayed images.

The diffractive structure in step S105 may be used to form the device 100 itself, for example by writing the diffractive structure directly into a carrier layer provided on a device substrate. However, more preferably for replication of large numbers of devices, the diffractive structure generated in step S105 is used to form a replication tool defining the diffractive structure of the finished device. The replication tool—or "master"—may then be used to form a number of such devices using techniques such as embossing and hot stamping. The device of the present invention is principally designed for viewing in reflection, in which case the diffractive structure of the device will have a thin reflective metal or high refractive index coating applied to it. However, in alternative arrangements the device of the present invention may be designed to be viewed transmission.

In embodiments in which a gap region is provided between diffractive regions, the diffractive regions are typically formed in the same manufacturing step as described above. Where a non-diffractive component is provided within a gap region, this is typically provided in a separate manufacturing step to the formation of the diffractive structure using techniques known in the art.

In the preferred method described in FIG. 13 the full kinoforms are initially generated or obtained, with the respective portions thereof subsequently selected in steps S103 and S104. This provides good flexibility in generation of the devices, as different portions of the "full" representations may be chosen dependent on the desired replay characteristics without having to recalculate the diffractive structure on a case by case basis. However, in alternative embodiments it is envisaged that the desired portions of the full kinoforms used to form the first and second diffractive regions may be generated directly (i.e. rather than selecting the portions from the generated "full" kinoforms).

Figure 13:
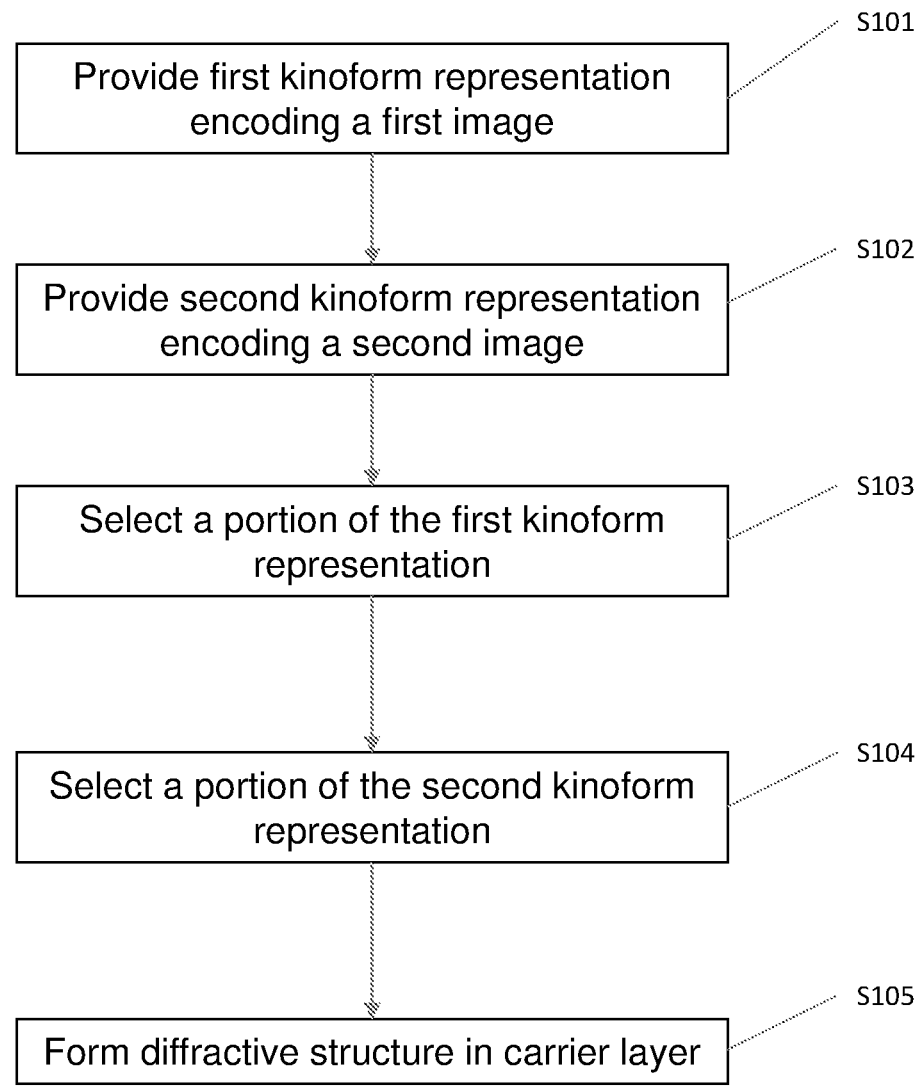
FIG. 13 is a flow diagram illustrating a preferred method of manufacturing an optical device according to the invention.
Figure 14:
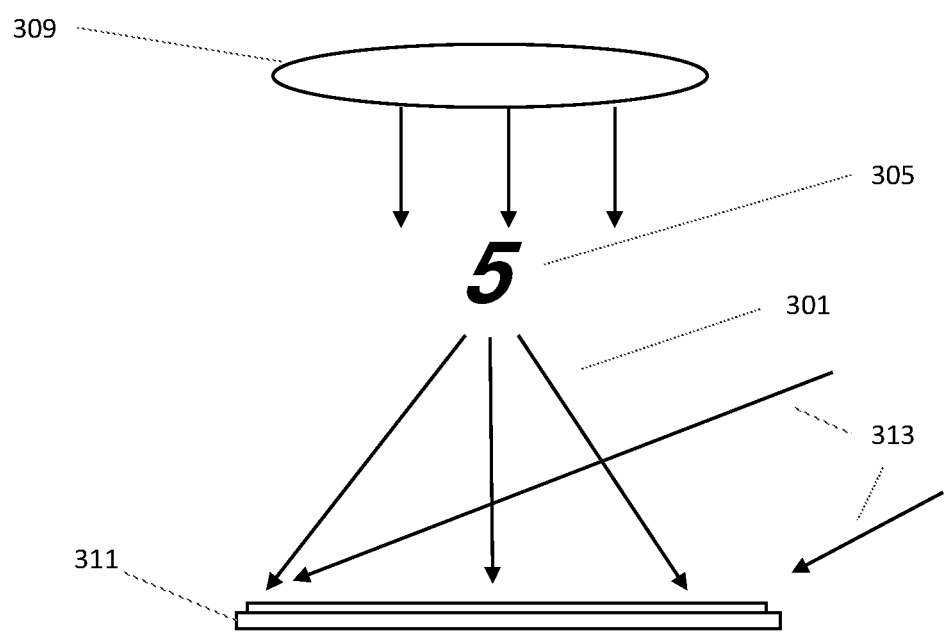
FIG. 14 illustrates an example geometry that may be used to form an optical device according to the invention using classical holography techniques.

In steps S101 and S102 above described in FIG. 13, the first and second kinoform representations were obtained using computational techniques. In alternative embodiments, it is envisaged that these "full" kinoforms may be obtained using classical techniques, as will now be discussed with reference to FIG. 14. FIG. 14 is a schematic illustration of a geometry for recording a "full" kinoform hologram using classical techniques. An object beam 301 is initially directed through a convex lens 309 such that a collimated beam of light is incident on an object 305 (in this case the alphanumeric character "5"). The phase information of the electric field originating from the object 305 is inherently contained within the object beam that is subsequently incident on a photosensitive resist (such as silver halide emulsion) on hologram plate 311. The interference pattern generated with a reference beam 313 (that is coherent with the object beam 301) is recorded in the photosensitive resist in order to form the classical "full" kinoform diffractive structure encoding the image of the object 305. Respective portions of the physical kinoforms may then be selected as discussed above with reference to steps S103 and S104 in FIG. 13, and the portions combined together in respective diffractive regions in order to form the diffractive structure of the optical device.

Optical devices of the sorts described above can be incorporated into or applied to any product for which an authenticity check is desirable; in which case they act as security devices. In particular, such devices may be applied to or incorporated into documents of value such as banknotes, passports, driving licences, cheques, identification cards etc. The complete security device can either be formed directly on the security document or may be supplied as part of a security article, such as a security thread or patch, which can then be applied to or incorporated into such a document.

Such security articles can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travelers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security article may be incorporated into a paper or polymer base substrate so that it is viewable from both sides of the finished security substrate at at least one window of the document. Methods of incorporating security elements in such a manner are described in EP-A-1141480 and WO-A-03054297. In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and EP-A-1398174.

The security device may also be applied to one side of a paper substrate, optionally so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

Figure 15:
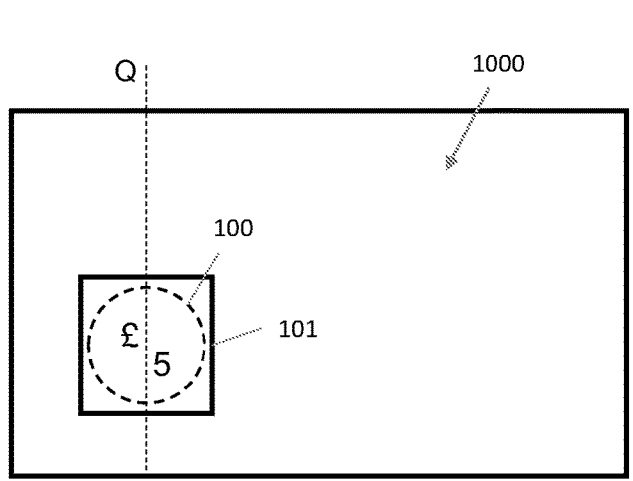
FIGS. 15 to 17 illustrate various examples of incorporating security devices according to the invention into security documents.
Figure 15:
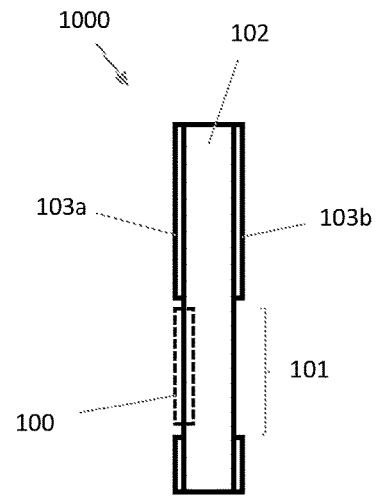
Figure 16:
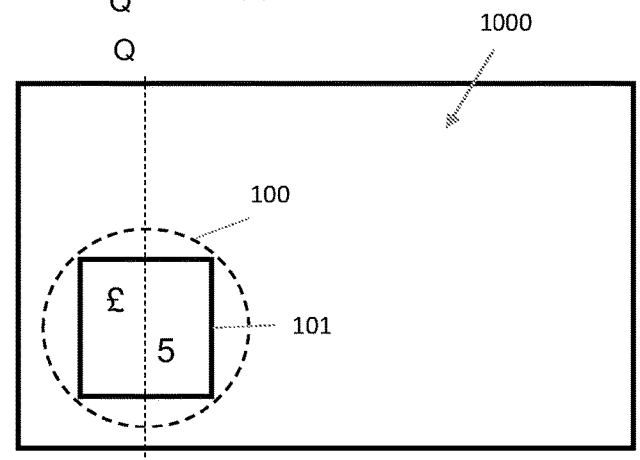
Figure 16:
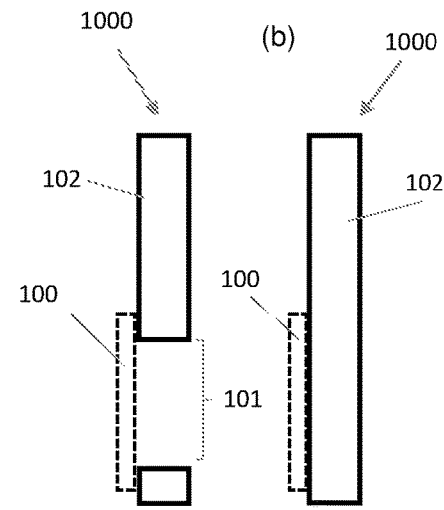
Figure 17:
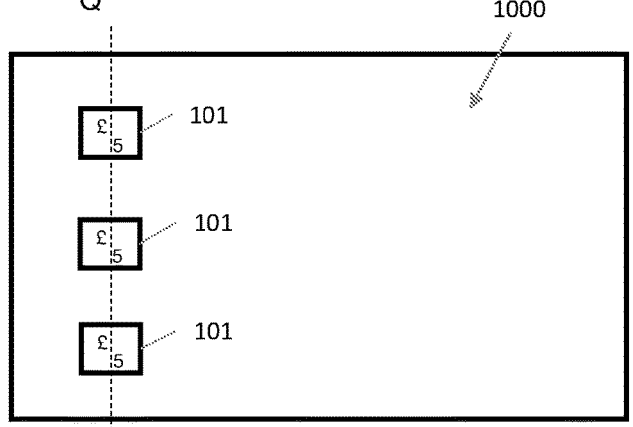
Figure 17:
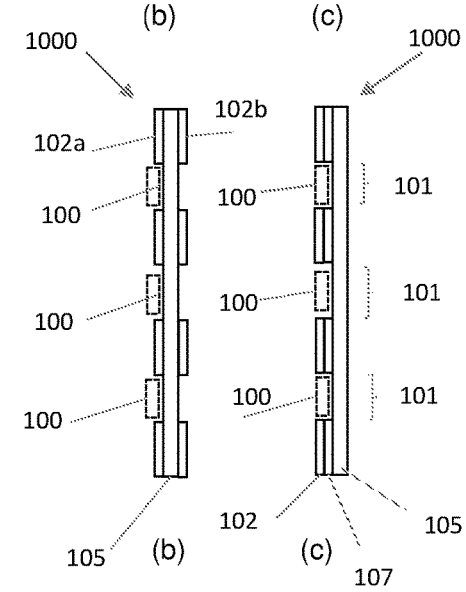

FIGS. 15, 16 and 17 depict examples of security documents in which security devices of the sorts described above have been incorporated. FIG. 15 shows a first exemplary security document, here a banknote 1000, in (a) plan view and (b) cross-section along line Q-Q'. Here, the banknote 1000 is a polymer banknote, comprising an internal transparent polymer substrate 102 which is coated on each side with opacifying layers 103a and 103b in a conventional manner. In some cases, the opacifying layers may be provided on one side of the substrate 102 only. The opacifying layers 103a and 103b are omitted in a region of the document so as to define a window 101, here having a square shape. Within the window region 101 is located a security device 100 in accordance with any of the embodiments discussed above. The security device 100 may be formed by applying a suitable resist material onto the substrate 102, in which the diffractive structure is formed. Alternatively, the security device 100 may have been formed separately on a security article such as a transfer patch or label. In this case, the security device 100 may be affixed to the transparent substrate 102 inside the window region 101 by means of a suitable adhesive. Application may be achieved by a hot or cold transfer method e.g. hot stamping.

It should be noted that a similar construction could be achieved using a paper/plastic composite banknote in which the opacifying layers 103a and 103b are replaced by paper layers laminated (with or without adhesive) to an internal transparent polymer layer 102. The paper layers may be omitted from the window region from the outset, or the paper could be removed locally after lamination. In other constructions, the order of the layers may be reversed with a (windowed) paper layer on the inside and transparent polymer layers on the outside.

FIG. 15 shows the use of a "full" window where the regions where the opacifying layers are omitted are in register. It will be appreciated that the device 100 may be applied in a "half window", for example in a case where opacifying layer 103b was present across window region 101.

In FIG. 16, the banknote 1000 is of conventional construction having a substrate 102 formed for example of paper or other relatively opaque or translucent material. The window region 101 is formed as an aperture through the substrate 102. The security device 100 is applied as a patch overlapping the edges of window 101 utilising an adhesive to join the patch security article to the document substrate 102. Again, the application of the security device and document could be achieved using various methods including hot stamping. FIG. 16(c) shows a variant in which the window 101 is omitted and the device 100 is simply applied to a section of the substrate 102 using any convenient application technique such as hot stamping. In such arrangements the device 100 will of course only be viewable from one side of the security document 100.

FIG. 17 depicts a third example of a security document, again a banknote 1000, to which a security article 105 in the form of a security thread or security strip has been applied. Three security devices 100 each carried on the strip 105 are revealed through windows 101, arranged in a line on the document 1000. Two alternative constructions of the document are shown in cross-section in FIGS. 17(b) and 17(c). FIG. 17(b) depicts the security thread or strip 105 incorporated within the security document 1000, between two portions of the document substrate 102a, 102b. For example, the security thread or strip 105 may be incorporated within the substrate's structure during the paper making process using well known techniques. To form the windows 101, the paper may be removed locally after completion of the paper making process, e.g. by abrasion. Alternatively, the paper making process could be designed so as to omit paper in the desired window regions. FIG. 17(c) shows an alternative arrangement in which the security thread or strip 105 carrying the security devices 100 is applied to one side of document substrate 102, e.g. using adhesive 107. The windows 101 are formed by the provision of apertures in the substrate 102, which may exist prior to the application of strip 105 or be formed afterwards, again for example by abrasion.

Many alternative techniques for incorporating security documents of the sorts discussed above are known and could be used. For example, the above described device structures could be formed on other types of security document including identification cards, driving licenses, bankcards, passports and other laminate structures, in which case the security device may be incorporated directly within the multilayer structure of the document.

The invention claimed is:

1. An optical device that exhibits a variable optical effect upon illumination, the optical device having a diffractive structure comprising a first diffractive region and a second diffractive region; wherein
the first diffractive region is formed of a portion of a first full kinoform diffractive structure, wherein the first full kinoform diffractive structure contains a first complete phase function to produce an electric field propagating from a first image object and thereby encodes a first image, whereby the first diffractive region defines a perceived motion and depth of the first image upon tilting the device in the form of a replayed image of the first image; and
the second diffractive region is formed of a portion of a second full kinoform diffractive structure, wherein the second full kinoform diffractive structure contains a second complete phase function to produce an electric field propagating from a second image object and thereby encodes a second image, whereby the second diffractive region defines a perceived motion and depth of the second image upon tilting the device in the form of a replayed image of the second image; wherein
the first image is different from the second image;
the portion of the first full kinoform diffractive structure and the portion of the second full kinoform diffractive structure are such that the perceived motion and/or depth of the replayed first and second images upon tilting the device are different;
the first diffractive region and the second diffractive region are laterally separate;
each of the first diffractive region and the second diffractive region are discernible by the naked human eye; and
the optical device is a security device.

2. The optical device of claim 1, wherein when the device is illuminated, the first diffractive region exhibits the first image that is perceived to be in front of the plane of the device, or behind the plane of the device dependent on viewing angle, and that is perceived to move within a first image area corresponding to the first diffractive region upon a change in viewing angle; and
the second diffractive region exhibits the second image that is perceived to be in front of the plane of the device, or behind the plane of the device dependent on viewing angle, and that is perceived to move within a second image area corresponding to the second diffractive region upon a change in viewing angle.

3. The optical device of claim 2, wherein the first and second image areas do not overlap.

4. The optical device of claim 1, wherein the first image is generated substantially completely by diffraction of incident light from the first diffractive region, and the second image is generated substantially completely by diffraction of incident light from the second diffractive region.

5. The optical device of claim 1, wherein each of the first diffractive region and the second diffractive region has a size greater than 150 microns.

6. The optical device of claim 1, wherein each of the first diffractive region and the second diffractive region has dimensions greater than 1 millimetre×1 millimetre.

7. The optical device of claim 1, wherein the portion of the first full kinoform diffractive structure and the portion of the second full kinoform diffractive structure are such that,
at least at one viewing angle, the first image is perceived to be on one side of the plane of the optical device, and the second image is perceived to be on the opposing side of the plane of the optical device.

8. The optical device of claim 1, wherein the portion of the first full kinoform diffractive structure and the portion of the second full kinoform diffractive structure are such that, upon tilting the device, the first image and the second image are perceived to move in substantially opposing directions when the device it tilted about at least one axis.

9. The optical device of claim 1, wherein the first diffractive region and the second diffractive region are laterally spaced apart.

10. The optical device of claim 9, further comprising a non-diffractive component located between the first diffractive region and the second diffractive region.

11. The optical device of claim 1, wherein the first and second diffractive regions are not interlaced with each other.

12. The optical device of claim 1, wherein each of the first diffractive region and the second diffractive region are substantially continuous.

13. The optical device of claim 1, wherein each of the first full kinoform diffractive structure and the second full kinoform diffractive structure is a binary kinoform diffractive structure.

14. The optical device of claim 1, wherein the diffractive structure further comprises a portion of a third full kinoform diffractive structure that encodes a third image, arranged to form a third diffractive region of the diffractive structure; wherein
the third diffractive region is laterally separate to the first diffractive region and the second diffractive region; and
the third diffractive region is discernible by the naked human eye.

15. A method of forming an optical device that exhibits a variable optical effect upon illumination, the method comprising:
providing a portion of a first full kinoform representation, wherein the first full kinoform representation contains a complete phase function to produce an electric field propagating from a first image object and thereby encodes a first image;
providing a portion of a second full kinoform representation, wherein the second full kinoform representation contains a complete phase function of an electric field propagating from a second image object and thereby encodes a second image;
forming a diffractive structure in a carrier layer, wherein the diffractive structure comprises
a first diffractive region corresponding to the portion of the first full kinoform representation whereby the first diffractive region defines a perceived motion and depth of the first image upon tilting the device in the form of a replayed image of the first image, and
a second diffractive region corresponding to the portion of the second full kinoform representation whereby the second diffractive region defines a perceived motion and depth of the second image upon tilting the device in the form of a replayed image of the second image; wherein
the first image is different from the second image;

the portion of the first full kinoform representation and the portion of the second full kinoform representation are such that the perceived motion and/or depth of the replayed first and second images upon tilting the device are different;

the first diffractive region and the second diffractive region are laterally separate;

each of the first diffractive region and the second diffractive region are discernible to the naked human eye; and the optical device is a security device.

16. The method of claim 15, wherein the diffractive structure is formed using maskless lithography such as electron beam lithography or direct laser writing.

17. The method of claim 15, wherein the step of providing the portion of the first full kinoform representation comprises providing a first full kinoform representation encoding the first image, and selecting a portion of the first full kinoform representation; and the step of providing the portion of the second full kinoform representation comprises providing a second full kinoform representation encoding the second image, and selecting a portion of the second kinoform representation.

18. The method of claim 15, wherein the portion of the first full kinoform representation and the portion of the second full kinoform representation are computer generated.

19. A security article or a security document comprising a security device according to claim 1.

* * * * *